United States Patent
Bergandt et al.

(10) Patent No.: US 8,940,389 B2
(45) Date of Patent: Jan. 27, 2015

(54) SCRATCH- AND ABRASION-RESISTANT COATINGS ON POLYMERIC SURFACES

(75) Inventors: Heike Bergandt, Marl (DE); Liv Randewig, Witten (DE); Marie-Theres Wilkes, Dorsten (DE)

(73) Assignee: Evonik Degussa GmbH, Essen (DE)

( * ) Notice: Subject to any disclaimer, the term of this patent is extended or adjusted under 35 U.S.C. 154(b) by 294 days.

(21) Appl. No.: 12/300,054

(22) PCT Filed: May 9, 2007

(86) PCT No.: PCT/EP2007/054461
§ 371 (c)(1),
(2), (4) Date: Nov. 7, 2008

(87) PCT Pub. No.: WO2007/144235
PCT Pub. Date: Dec. 21, 2007

(65) Prior Publication Data
US 2009/0162631 A1 Jun. 25, 2009

(30) Foreign Application Priority Data
Jun. 14, 2006 (DE) .......................... 10 2006 027 480

(51) Int. Cl.
B32B 27/08 (2006.01)
B05D 3/02 (2006.01)
B05D 3/06 (2006.01)
C09D 183/08 (2006.01)
C09D 4/00 (2006.01)

(52) U.S. Cl.
CPC ................ *C09D 183/08* (2013.01); *C09D 4/00* (2013.01)
USPC ........... 428/220; 428/412; 428/447; 427/387; 427/386

(58) Field of Classification Search
USPC ........... 428/220, 412, 447; 427/387, 386, 558
See application file for complete search history.

(56) References Cited

U.S. PATENT DOCUMENTS

| | | | |
|---|---|---|---|
| 4,746,366 A * | 5/1988 | Philipp et al. ............ | 106/287.19 |
| 6,072,008 A * | 6/2000 | Matsuno et al. ........... | 525/330.3 |
| 6,506,921 B1 | 1/2003 | Wilkes et al. | |
| 6,811,856 B2 | 11/2004 | Nun et al. | |
| 6,852,389 B2 | 2/2005 | Nun et al. | |
| 6,855,396 B1 | 2/2005 | Mennig et al. | |
| 6,858,284 B2 | 2/2005 | Nun et al. | |
| 7,083,828 B2 | 8/2006 | Muller et al. | |
| 7,235,298 B2 | 6/2007 | Katusic et al. | |
| 7,250,219 B2 | 7/2007 | Bier et al. | |
| 7,374,743 B2 | 5/2008 | Katusic et al. | |
| 7,399,353 B2 | 7/2008 | Nun et al. | |
| 2003/0069350 A1* | 4/2003 | Yoshihara et al. ............ | 524/588 |
| 2004/0154106 A1 | 8/2004 | Oles et al. | |

(Continued)

FOREIGN PATENT DOCUMENTS

DE 38 28 098 3/1990
DE 39 17 535 12/1990

(Continued)

OTHER PUBLICATIONS

Machine_English_Translation_JP_2004043559_A; Osuga, Akihiro; Stain-Resistant Coating Composition for Precoated Metal, Topcoating Method and Coated Article; Feb. 12, 2004; JPO; whole document.*

(Continued)

*Primary Examiner* — Aaron Austin
*Assistant Examiner* — Tahseen N Khan
(74) *Attorney, Agent, or Firm* — Oblon, Spivak, McClelland, Maier & Neustadt, L.L.P.

(57) ABSTRACT

The present invention relates to a composition which contains
a) at least one reaction product of
  a1) a silane of the general formula

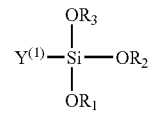

in which
$Y^{(1)}$=3-glycidyloxypropyl-, and
$R_1$, $R_2$, $R_3$=like or unlike alkyl groups having 1 to 6 carbon atoms, and
  a2) a silane of the general formula

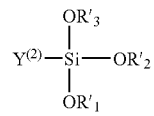

in which
$Y^{(2)}$=N-2-aminoethyl-3-aminopropyl- or $NH_2(CH_2)_2 NH(CH_2)_2NH(CH)_3$, and
$R'_1$, $R'_2$, $R'_3$=like or unlike alkyl groups having 1 to 6 carbon atoms, and
b) at least one inorganic filler, and
c) a solvent having a boiling point at a temperature ≤85° C., and
d) water, and
e) a catalyst selected from organic and inorganic acids,
to a method of producing a surface coating on a polymeric surface by applying the composition of the invention, and to articles having at least one polymeric surface which have the surface coating of the invention, and to their use.

26 Claims, No Drawings

(56) References Cited

U.S. PATENT DOCUMENTS

| | | |
|---|---|---|
| 2005/0112326 A1 | 5/2005 | Nun et al. |
| 2005/0118911 A1 | 6/2005 | Oles et al. |
| 2005/0163951 A1 | 7/2005 | Oles et al. |
| 2005/0167877 A1 | 8/2005 | Nun et al. |
| 2005/0205830 A1 | 9/2005 | Oles et al. |
| 2005/0208269 A1 | 9/2005 | Nun et al. |
| 2005/0227045 A1 | 10/2005 | Oles et al. |
| 2005/0253302 A1 | 11/2005 | Nun et al. |
| 2006/0070551 A1* | 4/2006 | Kanamori et al. ....... 106/287.17 |
| 2006/0222815 A1 | 10/2006 | Oles et al. |
| 2006/0235143 A1 | 10/2006 | Muller et al. |
| 2007/0014970 A1 | 1/2007 | Nun et al. |
| 2007/0110906 A1 | 5/2007 | Edelmann et al. |
| 2007/0254178 A1 | 11/2007 | Nun |
| 2008/0084686 A1 | 4/2008 | Gutsch et al. |
| 2008/0206174 A1 | 8/2008 | Bergandt et al. |
| 2008/0280148 A1 | 11/2008 | Nun et al. |
| 2008/0292799 A1 | 11/2008 | Nun et al. |
| 2010/0226869 A1 | 9/2010 | Bergandt et al. |

FOREIGN PATENT DOCUMENTS

| | | |
|---|---|---|
| DE | 40 11 045 | 10/1991 |
| DE | 199 52 040 | 5/2001 |
| DE | 102 45 725 | 4/2004 |
| EP | 1 288 270 A1 | 3/2003 |
| JP | 59107301 A * | 6/1984 |
| JP | 2004043559 A * | 2/2004 |
| WO | 2005 003218 | 1/2005 |
| WO | WO 2007/003828 A2 | 1/2007 |

OTHER PUBLICATIONS

STIC Structure Search on "Y(2)" of Independent Claim 33, 12300054-448507-EICsearch, STN. Mar. 13, 2014, whole document.*

U.S. Appl. No. 12/067,855, filed Mar. 24, 2008, Nun, et al.
U.S. Appl. No. 12/037,431, filed Feb. 26, 2008, Bergandt, et al.
U.S. Appl. No. 12/159,103, filed Jun. 25, 2008, Nun, et al.
U.S. Appl. No. 13/002,622, filed Jan. 4, 2011, Bergandt, et al.
(German Industrial Norm) DIN EN 13523-11 Feb. 2005 ( 7 pp.).
(German Industrial Norm) DIN EN ISO 2409 Aug. 2007 (16 pp.).
(German Industrial Norm) DIN EN ISO 2813 Jun. 1999 (10 pp.).
(German Industrial Norm) DIN EN ISO 15184 May 2011 (12 pp.).

* cited by examiner

SCRATCH- AND ABRASION-RESISTANT COATINGS ON POLYMERIC SURFACES

CROSS-REFERENCE TO RELATED APPLICATIONS

This application is a National Stage of PCT/EP2007/54461 filed on May 9, 2007. This application is based upon and claims the benefit of priority to German Application No. 10 2006 027 480.6 filed on Jun. 14, 2006.

BACKGROUND OF THE INVENTION

The present invention relates to a method of producing hard, scratch-resistant surface coatings by way of the sol-gel technology on a wide variety of polymers.

The production of glass like coatings on steel polymers has been known for a long time and described in numerous instances.

By scratch resistance is meant, here and below, the resistance of the surface coating of a material to the imposition of scratches, which is determined using a mar resistance tester. A disk of defined shape and size is pressed with a defined force—the applied-pressure force, measured in N—onto the material provided with the surface coating, and, with this applied-pressure force maintained, is guided at a defined inclination and in a fluid movement over the surface of the surface coating. This movement is repeated, each time with an increased applied-pressure force, until alteration in the form of a linear mark becomes visible on the surface. The applied-pressure force setting at that point is, in the context of the present invention, the measure of the scratch resistance. In the context of the present invention the apparatus used is the mar resistance tester model 435 from Erichsen GmbH & Co KG, Am Iserbach 14, D-58675 Hemer, Germany.

By abrasion resistance is meant, here and below, the loss in weight suffered by the surface coating of material as a result of abrasion effected under defined conditions. This abrasion is brought about by two abrading wheels, whose outside faces have a defined roughness and which are moved abrasively over the surface coating with a defined number of rotations and with an application force which is defined by the mass of the abrading wheel. The apparatus used in this case is described by and obtainable from Taber Industries (455 Bryant Street, North Tonawanda, N.Y. 14120, USA; http://www.taberindustries.com).

DE 38 28 098 A1 describes the production of scratch-resistant materials starting from organofunctional silanes and at least one aluminium alkoxide. A composition obtained by hydrolytic polycondensation of at least one aluminium compound and at least one organofunctional silane is applied to a substrate and cured by heating. A particular step in the production of the composition is seen as being its necessary precondensation by addition of water in a sub-stoichiometric ratio prior to application of the composition to the substrate. The water must be added in several steps in order to avoid unwanted precipitation.

DE 39 17 535 A1 as well describes the production of compositions for scratch-resistant coatings on the basis of hydrolysable silicon compounds. Besides organofunctional silanes use is made of aluminium alkoxides, titanium alkoxides and/or zirconium alkoxides. To achieve the scratch resistance a volatile fraction of the hydrolysis compounds is removed by evaporation. In this method, again, water is added in a substoichiometric ratio to effect precondensation of the mixture of hydrolyzable silicon compounds, thereby necessitating a separate method step. This precondensation can be accelerated through the use of a condensation catalyst. Only after the precondensation and the removal of volatile hydrolysis compounds by evaporation is the composition applied to the substrate and subsequently cured by heating for a few minutes to two hours.

A combination of alkoxides of Al, Ti and/or Zr and at least one organofunctional silane is described in U.S. Pat. No. 4,746,366. This combination is precondensed by addition of water in stages. The hydrolysis products are removed from the combination under reduced pressure. The resulting product is applied to the substrate and cured by thermal heating for a duration of a few minutes up to two hours.

Coating materials for producing abrasion-resistant protective coats on substrates made of plastic are described in DE 199 52 040 A1 and DE 102 457 25 A1. The coating material disclosed in these specifications must be applied in at least two coats, namely a scratch-resistance coat or primer coat and a top coat, then precondensed and at least partly cured. The precondensation time can be shortened through the addition of a condensation accelerator. Curing the coating formed from these coats takes times of at least 30 minutes at a temperature of 130° C.

DE 40 11 045 A1 describes the production of a scratch-resistant coating to which a commercially available photoinitiator is added. After this coating material has been applied to a plastics substrate, it can be cured thermally or by irradiation with UV light. As a result of this photochemical treatment a short cure time of 120 seconds is achieved.

A feature common to all of these publications is that the production of the coatings and/or coating materials includes a time-consuming step of precondensation. A further disadvantage of the prior art is that the coatings must be applied multiply, up to a coating thickness of more than 15 µm, in order to acquire the desired scratch resistance or abrasion resistance. For coatings of this kind, therefore, it is necessary to expend a relatively high level of time and cost until the coated plastics surface is robust or serviceable. The generally long cure time, of up to 2 hours, is shortened in the prior art only through the use of a photoinitiator, which effects curing by means of UV irradiation. In the known literature there is no information on coatings or coating materials which are produced via a sol-gel technique and can be cured thermally within times of up to 5 minutes.

It was an object of the present invention to provide a method, improved over the prior art, of producing scratch-resistant and abrasion-resistant coatings on polymeric surfaces that does not have one or more disadvantages of the prior art.

BRIEF SUMMARY OF THE INVENTION

This object is surprisingly achieved by means of a composition which contains
a) at least one reaction product of
  a1) a silane of the general formula

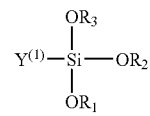

in which
Y$^{(1)}$=3-glycidyloxypropyl-, and
R$_1$, R$_2$, R$_3$=like or unlike alkyl groups having 1 to 6 carbon atoms, and a2) a silane of the general formula

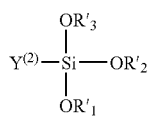

in which
Y$^{(2)}$=N-2-aminoethyl-3-aminopropyl- or NH$_2$ (CH$_2$)$_2$NH (CH$_2$)$_2$NH(CH)$_3$, and
R'$_1$, R'$_2$, R'$_3$=like or unlike alkyl groups having 1 to 6 carbon atoms, and
b) at least one inorganic filler, and
c) a solvent having a boiling point at a temperature ≤85° C., and
d) water, and
e) a catalyst selected from organic and inorganic acids.

The present invention accordingly provides a composition which contains
a) at least one reaction product of
a1) a silane of the general formula

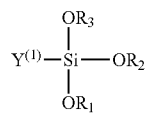

in which
Y$^{(1)}$=3-glycidyloxypropyl-, and
R$_1$, R$_2$, R$_3$=like or unlike alkyl groups having 1 to 6 carbon atoms, and
a2) a silane of the general formula

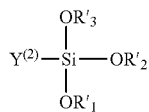

in which
Y$^{(2)}$=N-2-aminoethyl-3-aminopropyl- or NH$_2$ (CH$_2$)$_2$NH (CH$_2$)$_2$NH(CH)$_3$, and
R'$_1$, R'$_2$, R'$_3$=like or unlike alkyl groups having 1 to 6 carbon atoms, and
b) at least one inorganic filler, and
c) a solvent having a boiling point at a temperature ≤85° C., and
d) water, and
e) a catalyst selected from organic and inorganic acids.

The invention further provides a method of producing a surface coating on a polymeric surface, characterized in that the composition of the invention is applied to the polymeric surface by dipping, spreading, knifecoating, brushing, rolling, roller-coating or spraying and is cured thereon.

The invention likewise provides a silicon-containing surface coating characterized in that the surface coating has a scratch resistance from 3 N to 20 N.

Likewise provided by the invention is an article having at least one polymeric surface which has the surface coating of the invention.

Further provided by the present invention is the use of the article of the invention for lining apparatus, fittings, instruments, measuring-instruments, sanitary installations, kitchen appliances, household appliances, vehicle interiors, cockpits, displays, viewing windows or furniture.

Further provided by the present invention is the use of the article of the invention as a plate, dish, shaped part, housing, button, lever, foot, door, lid, base, side walls, handle, trim insert or splash protector.

The present invention likewise provides for the use of the article of the invention as a household article, household toolset and parts thereof, as a central implement store or implement rail, kitchen- and tableware, party cutlery, tray, cooking utensil, vase, coverings of wall clocks, stereo equipment, casings of household appliances, baubles, wrist straps, jewelry, lamps and lights, equipment, implements and kit for games, sports and leisure, garden furniture, garden implements, seating facilities in parks or playgrounds, instruments, accessories and devices for medical purposes and patients, spectacle frames, hospital installations or parts thereof.

DETAILED DESCRIPTION OF THE INVENTION

The advantage of the method of the present invention is that the surface coating of the invention on a plastics surface or on a polymer sheet cures within just one minute at a temperature of 150° C. If such surfaces or sheets are coated in a reel-to-reel process, on a coil line, or in another continuous process, it is possible, on the basis of this cure time for the coating of the invention, which is shorter than that in the prior art, to realize substantially higher process speeds or production rates per unit time and hence to lower the production costs for the product significantly as compared with the prior art.

A further advantage of the method of the present invention is that the surface coating need only be applied a single time to give a crack-free, gapless surface coating.

A crack-free surface coating in the context of the present invention is a surface coating which when viewed under a scanning electronic microscope (SEM) using a magnification factor of 10 000 reveals no crack when 10 different sites on the surface are assessed.

The surface coating of the invention has a thickness of not more than 5 μm, which is significantly lower than in the prior art. As a result of this the present invention proves to have the further advantage of employing a smaller quantity of material for the surface coating than in the case of conventional coatings, as a result of which it is possible to achieve further cost savings over the prior art.

It is likewise an advantage of the method of the present invention that the thermal weldability of the polymers coated in accordance with the method of the invention is not adversely affected by the surface coating of the invention.

The method of the present invention has the further advantage that the mar test on the surface coating of the invention leads to substantially better results as compared with prior-art coatings. In the case of printed polyvinyl chloride (PVC) films to which the surface coating of the invention is applied by the method of the invention the print remains undamaged up to a mar-test force of 20 N. In the case of coatings applied in accordance with prior art to printed PVC films even a force above 2.5 N causes damage to the print.

The composition of the invention and the method of the invention are described below by way of example, without any intention that this should restrict the invention, whose scope of protection is given by the claims and the description. The claims themselves are also part of the disclosure content of the present invention. Where ranges, including ranges of preference, are indicated in the text below, the disclosure content of the present invention should also be taken to include all of the theoretically possible subranges situated within said ranges, even where, for reasons of greater ease of comprehension, such subranges have not been explicitly specified.

The composition of the invention is distinguished by the fact that it contains
a) at least one reaction product of
  a1) a silane of the general formula

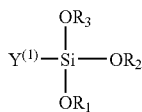

in which
$Y^{(1)}$=3-glycidyloxypropyl-, and
$R_1$, $R_2$, $R_3$=like or unlike alkyl groups having 1 to 6 carbon atoms, and
  a2) a silane of the general formula

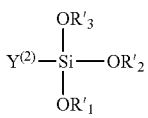

in which
$Y^{(2)}$=N-2-aminoethyl-3-aminopropyl- or $NH_2(CH_2)_2NH(CH_2)_2NH(CH_3)_3$, and
$R'_1$, $R'_2$, $R'_3$=like or unlike alkyl groups having 1 to 6 carbon atoms, and
b) at least one inorganic filler, and
c) a solvent having a boiling point at a temperature ≤85° C., and
d) water, and
e) a catalyst selected from organic and inorganic acids.

The alkyl groups $R_1$, $R_2$, $R_3$ and/or $R'_1$, $R'_2$, $R'_3$ in the composition of the invention can with preference be alike at least in pairs. In the composition of the invention it is possible for methyl and/or ethyl groups to be particularly preferred as alkyl groups.

Preferred compositions are those wherein the reaction product of component a) is based on diamino-alkylalkoxysilane and/or triaminoalkylalkoxysilane.

Component b) of the composition of the invention contains preferably an inorganic filler selected from $SiO_2$, $TiO_2$, $ZnO$, $Al_2O_3$, $BaSO_4$, $CeO_2$ and $ZrO_2$, or a mixture of these fillers. With further preference the inorganic filler in the composition of the invention may be selected from $SiO_2$, $TiO_2$ and $ZnO$ or from a mixture of these fillers. With very particular preference component b) of the composition of the invention may contain as its inorganic filler Aerosil® R7200, R8200, R9200 and/or R812S, available from Degussa A G, Rodenbacher Chaussee 4, D-63457 Hanau-Wolfgang, Germany.

It may additionally be advantageous if component b) of the composition of the invention contains particles which have an average particle size $d_{50\%}$ from 10 to 200 nm, preferably from 20 to 180 nm, more preferably from 30 to 150 nm, with further preference from 50 to 135 nm, with particular preference from 75 to 120 nm, and with further particular preference from 90 to 110 nm.

As inorganic filler the composition contains preferably particles of $SiO_2$, $TiO_2$, $ZrO_2$, or a mixture of these particles in the stated particle sizes.

It may additionally be advantageous if component b) of the composition of the invention contains particles which may be agglomerated or unagglomerated. With particular preference the particles in component b) of the composition of the invention may be agglomerated. In addition it may be advantageous if these particles are, or contain Aerosil® R7200, R8200, R9200 and/or R812S.

Component c) of the composition of the invention may be selected from the group of alcohols of the general formula $C_nH_{2n+1}OH$, in which n=1 to 4, or from a mixture of these alcohols, or may be selected from ketones, selected from acetone and methyl ethyl ketone, or a mixture of these ketones. With preference component c) of the composition of the invention may contain methyl ethyl ketone (MEK). Component c) of the composition of the invention is preferably selected from ethanol, 1-propanol and 2-propanol, or a mixture of these alcohols. With very particular preference component c) of the composition of the invention is ethanol.

It may be particularly advantageous if component c) of the composition of the invention has a boiling point of not more than 85° C.

Component e) of the composition of the invention may advantageously be selected from aqueous nitric acid. With preference component e) may contain nitric acid in a concentration from 0.5 to 1%, more preferably from 0.6% to 0.9% and very preferably from 0.65 to 0.75% by weight.

It may additionally be advantageous if the composition of the invention contains a further component a3) which may be at least one reaction product of a further silane

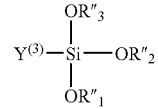

in which $Y^{(3)}$ is selected from fluoro-, fluoroalkyl-, methacryloyl-, vinyl- and mercapto-, and
$R''_1$, $R''_2$, $R''_3$=like or unlike alkyl groups having 1 to 6 carbon atoms. With preference the alkyl groups $R''_1$, $R''_2$, $R''_3$ of this component a3) may be alike at least in pairs. In the composition of the invention it is possible for methyl groups and ethyl groups to be particularly preferred as alkyl groups.

The method of the invention for producing a surface coating on a polymeric surface is distinguished by the fact that the composition of the invention is applied to the polymeric surface by dipping, spreading, knifecoating, brushing, rolling, roller-coating or spraying and is cured thereon.

Preferably in the method of the invention the composition of the invention is applied once to the polymeric surface and cured thereon. With further preference in the method of the invention the composition of the invention is applied to the polymeric surface by spreading, rolling or spraying and is cured thereon.

In the method of the invention the composition of the invention may be heated preferably to a temperature from 90° C. to 150° C., more preferably to a temperature from 100 to 150° C., with further particular preference from 110 to 150° C., and with very particular preference to a temperature from 130 to 150° C., as a result of which the composition of the invention can be cured.

It may be particularly advantageous if in the method of the invention the composition of the invention is cured by irradiation with infrared light, preferably thermally, more preferably in an oven, with particular preference by being blown with hot air.

It may additionally be advantageous if in the method of the invention the composition of the invention is cured by heating for a duration from 1 to 300 seconds. With preference the composition of the invention can be cured by heating for a duration from 2 to 250 seconds, more preferably from 5 to 200 seconds, with further preference for a duration from 10 to 150 seconds, with particular preference from 20 to 120 seconds, with very particular preference for a duration from 30 to 90 seconds, in accordance with the method of the invention.

By the admixing of a component to the composition of the invention is meant, at this point and below, the act of dispersing by means of stirring, shaking or by means of finger-type ultrasonicators.

In the method of the invention it may be advantageous if the composition of the invention is admixed with component a1) in an amount from 5% to 40%, preferably 10% to 25%, by weight, with component a2) in an amount from 5% to 50%, preferably 10% to 30%, by weight, with component b) in an amount from 2% to 20%, preferably 2.5% to 20%, by weight, with component c) in an amount from 20% to 60%, preferably from 30% to 50%, by weight, with component d) in an amount from 0.5% to 5%, preferably from 1% to 3%, by weight, and with component e) in an amount from 0.02% to 0.5%, preferably from 0.03% to 0.3%, by weight, the specified amount being based in each case on the composition, and with the proviso that the sum of the weight fractions makes 100%.

In order to obtain a particularly scratch-resistant and abrasion-resistant surface coating after the composition of the invention is cured it may be advantageous if in the method of the invention components a1) and a2) are admixed to the composition of the invention in a molar ratio from 1:3 to 3:1. With particular preference components a1) and a2) can be admixed to the composition of the invention in a molar ratio from 1.5:2.5 to 2.5:1.5, with very particular preference in a molar ratio from 1:2 to 2:1. In the method of the invention it may be particularly advantageous if this composition is subsequently heated for a duration from 1 second to 2 minutes, preferably for a duration from 30 seconds to 1 minute, as a result of which this composition can be cured.

It may further be advantageous if in the method of the invention component a3) is admixed to the composition of the invention in an amount from 0.5% to 10% by weight, the specified amount being based on the composition, and with the proviso that the sum of the weight fractions of components a1), a2), a3) and b) to e) makes 100%.

Additionally it may be advantageous if in the method of the invention the composition of the invention is admixed with, as further components, f) film-forming binders selected from melamine resin and acrylate or a mixture of these film-forming binders, preferably in an amount from 0.001% to 15%, more preferably in an amount from 2% to 10% and very preferably in an amount from 5% to 8% by weight, and/or with g) epoxy resin, preferably in an amount from 0.001% to 15%, more preferably in an amount from 2% to 10% and very preferably in an amount from 5% to 8% by weight, the specified amount being based in each case on the composition, and with the proviso that the sum of the weight fractions of components a) to g) makes 100%.

It may additionally be advantageous if in the method of the invention the composition of the invention is admixed with, as a further component, h) an inorganic UV absorber selected from zinc oxide, cerium oxide and titanium dioxide, or a mixture of these inorganic absorbers, and/or an organic UV absorber selected from hydroxyphenylbenzotriazole, hydroxybenzophenone and HALS stabilizers, or a mixture of these organic absorbers, and the composition of the invention applied to the surface is treated with UV rays.

By HALS stabilizers are meant, at this point and below, sterically hindered amines. In the method of the invention it is possible with preference to use HALS stabilizers selected from Tinuvin 123, available from Ciba, and Lowilite 94, obtainable from Great Lakes Chemical Corporation, or a mixture of these stabilizers.

In the method of the invention it may be advantageous if the composition of the invention is admixed with component h) as component b).

Moreover it may be advantageous in the method of the invention if the composition of the invention is admixed first with components a1) and a2) and subsequently with components b) to e). With particular advantage it is possible in the method of the invention to admix the composition of the invention with components a1) and a2) by stirring or shaking. In addition with particular advantage it is possible in the method of the invention to admix the composition of the invention with components a) to e) by stirring. It may, furthermore, be particularly advantageous in the method of the invention if first of all component h) is dissolved and/or dispersed in component c) and this solution and/or dispersion is admixed to the composition of the invention before components a1), a2), b), d) and e) are admixed to the composition of the invention. It may be especially advantageous in the method of the invention if first of all component b) is dissolved and/or dispersed in component c), and the composition of the invention is admixed with components a1), d) and e), then with the solution and/or dispersion obtained from b) and c), and subsequently with component a2).

In an additionally preferred embodiment of the method of the invention it is possible for component h) to be present in the composition of the invention in an amount from 0.5% to 5% by weight, preferably in an amount from 1% to 4% by weight, more preferably from 2% to 3% by weight, the specified amount being based on the composition, and with the proviso that the sum of the weight fractions of components a) to h) makes 100%.

With the method of the invention it is possible to obtain surface coatings, especially the surface coatings of the invention.

The silicon-containing surface coating of the invention is distinguished by the fact that the surface coating has a scratch resistance of 3 N to 20 N. With preference it is possible for the surface coating of the invention to have a scratch resistance from 6 N to 20 N, preferably from 8 N to 20 N, more preferably from 10 N to 20 N, with further particular preference from 12 N to 20 N, and with very particular preference from 14 N to 20 N.

This surface coating preferably has an abrasion resistance from 0.1% to 0.5% by weight, with particular preference an abrasion resistance from 0.2% to 0.4% by weight.

The surface coating of the invention can preferably have a film thickness from 1 to 10 µm, with further preference a film thickness from 1.5 to 9 µm, more preferably from 2 to 8 µm, with further particular preference from 2.5 to 7 µm and with very particular preference from 3 to 5 µm.

The surface coating of the invention may advantageously be distinguished by the fact that this surface coating has an inorganic filler in the form of particles which have a homogeneous distribution in the volume occupied by the surface coating of the invention, as measured by a scanning electron microscope (SEM) image with a magnification factor of 10 000 on an area obtained by a section through the surface coating of the invention.

The surface coating of the invention may preferably have an extensibility from 0.5% to 10%, preferably from 2% to 7.5%, more preferably from 3% to 6%. In the context of the present invention the extensibility is the percentage increase in length by which the material having the surface coating of the invention can be extended along an arbitrary, imaginary straight line which lies in the surface of said surface coating without said surface coating of the invention exhibiting cracks, which is synonymous with saying that the surface coating of the invention remains crack-free after extension.

The surface coating of the invention may advantageously exhibit thermal weldability. In the context of the present invention a thermally weldable surface coating is one which after the thermal welding of two polymeric sheets which bear the surface coating of the invention is crack-free along the seam of the thermal weld within the definition given of freedom from cracks. In one preferred embodiment the seam of the thermal weld extends in the surface of the surface coating of the invention.

The surface coating of the invention can be obtained by the method of the invention.

The present invention further provides an article having at least one polymeric surface which bears the surface coating of the invention.

This article may preferably have a polymeric surface which may be selected from polyvinyl chloride (PVC), polyethylene terephthalate (PET), polyethylene (PE), polycarbonate (PC) and polymethyl methacrylate (PMMA), or a combination of these polymeric surfaces.

The article of the invention may be used for lining apparatus, fittings, instruments, measuring-instruments, sanitary installations, kitchen appliances, household appliances, vehicle interiors, cockpits, displays, viewing windows or furniture, or may be such an article.

In addition it is possible for the article of the invention to be used as a plate, dish, shaped part, housing, button, lever, foot, door, lid, base, side walls, handle, trim insert or splash protector, or to be such an article.

With preference it is possible for the article of the invention to be used as a household article, household toolset and parts thereof, as a central implement store or implement rail, kitchen- and tableware, party cutlery, tray, cooking utensil, vase, coverings of wall clocks, stereo equipment, casings of household appliances, baubles, wrist straps, jewelry, lamps and lights, equipment, implements and kit for games, sports and leisure, garden furniture, garden implements, seating facilities in parks or playgrounds, instruments, accessories and devices for medical purposes and patients, spectacle frames, hospital installations or parts thereof.

INVENTIVE EXAMPLE 1

5.6 g of 3-glycidyloxypropyltiethoxysilane were charged to a stirred vessel and 5 mg of concentrated nitric acid and 0.495 g of water were added with stirring. After 10 minutes of stirring a single-phase solution was obtained. Added to this solution were 1.63 g of Aerosil R8200, dispersed beforehand in 6.51 g of methyl ethyl ketone using a finger-type ultrasonicator. Subsequently 4.78 g of N-2-aminoethyl-3-aminopropyl-trimethoxysilane (DAMO) were added over a period of 5 minutes.

The resulting composition was applied in a thickness of 25 µm to a PVC sheet using a spiral-wound doctor blade and cured in an oven at a temperature of 150° C. for 1 minute. The coat thus cured had a thickness of 3 µm.

The mar test, involving measuring with a mar resistance tester model 435 from Erichsen GmbH, resulted in a scratch resistance of 20 N.

The abrasion resistance was measured using the Taber Abraser fitted with the CS 10 abrading wheel with an applied mass of 500 g, after 100 rotations. The weight loss determined after 100 rotations was 0.1% by weight.

COMPARATIVE EXAMPLE 1

5.6 g of 3-glycidyloxypropyltriethoxysilane were charged to a stirred vessel and 5 mg of concentrated nitric acid and 0.495 g of water were added with stirring. After 10 minutes of stirring a single-phase solution was obtained. Added to this solution were 1.63 g of Aerosil R8200, dispersed beforehand in 6.51 g of methyl ethyl ketone using a finger-type ultrasonicator. Subsequently 4.75 g of 3-aminopropyltriethoxysilane were added over a period of 5 minutes.

The resulting composition was applied in a thickness of 25 µm to a PVC sheet using a spiral-wound doctor blade and cured in an oven at a temperature of 150° C. for 2 minutes. The cured surface coating had a thickness of 3 µm.

The mar test, involving measuring with a mar resistance tester model 435 from Erichsen GmbH, resulted in a scratch resistance of 5 N.

The abrasion resistance was measured using the Taber Abraser instrument from Taber Industries, 455 Bryant Street, North Tonawanda, N.Y. 14120, USA fitted with the CS 10 abrading wheel with an applied mass of 500 g, after 100 rotations, and found to be 1% by weight.

The invention claimed is:

1. A composition, comprising:
a) at least one reaction product of
   a1) a silane of the formula:

$$Y^{(1)}-\underset{\underset{OR_1}{|}}{\overset{\overset{OR_3}{|}}{Si}}-OR_2,$$

in which
$Y^{(1)}$=3-glycidyloxypropyl-, and
$R_1$, $R_2$, $R_3$=like or unlike alkyl groups having 1 to 6 carbon atoms, a2) a silane of the formula:

$$Y^{(2)}-\underset{\underset{OR'_1}{|}}{\overset{\overset{OR'_3}{|}}{Si}}-OR'_2,$$

in which
$Y^{(2)}$=NH$_2$(CH$_2$)$_2$NH(CH$_2$)$_2$NH(CH$_2$)$_3$, and
$R'_1$, $R'_2$, $R'_3$=like or unlike alkyl groups having 1 to 6 carbon atoms, and a3) a silane of the formula:

$$Y^{(3)}-\underset{\underset{OR''_1}{|}}{\overset{\overset{OR''_3}{|}}{Si}}-OR''_2,$$

in which $Y^{(3)}$ is selected from fluoro-, methacryloyl-, vinyl- and mercapto-, and $R''_1$, $R''_2$, $R''_3$ are the same or different alkyl groups having 1 to 6 carbon atoms;

b) at least one inorganic filler selected from the group consisting of $SiO_2$, $TiO_2$, ZnO, $Al_2O_3$, $BaSO_4$, $CeO_2$, $ZrO_2$, and mixtures thereof;

c) a solvent having a boiling point at a temperature <85° C.;

d) water; and e) a catalyst selected from the group consisting of an organic acid and an inorganic acid.

2. The composition according to claim 1, wherein $R_1$, $R_2$, $R_3$ and/or $R'_1$, $R'_2$, $R'_3$ are alike at least in pairs.

3. The composition according to claim 1, wherein the inorganic filler is selected from the group consisting of $Al_2O_3$, $BaSO_4$, $CeO_2$, $ZrO_2$, and mixtures thereof.

4. The composition according to claim 1, wherein the inorganic filler has an average particle size $d_{50\%}$ from 10 to 200 nm.

5. The composition according to claim 1, wherein the component e) is aqueous nitric acid.

6. The composition of claim 1 prepared without precondensation.

7. The composition according to claim 1, wherein the component c) is at least one component selected from the group consisting of an alcohol of the formula $C_nH_{2n+1}OH$ in which n=1 to 4, a mixture of the alcohols, and a ketone, wherein the ketone is at least one ketone selected from the group consisting of acetone, methyl ethyl ketone, and a mixture thereof.

8. The composition according to claim 7, wherein the component c) is selected from the group consisting of ethanol, 1 propanol, 2-propanol, and a mixture thereof.

9. A composition, comprising:
a) at least one reaction product of
a1) a silane of the formula:

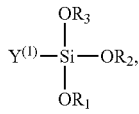

in which
$Y^{(1)}$=3-glycidyloxypropyl-, and
$R_1$, $R_2$, $R_3$=like or unlike alkyl groups having 1 to 6 carbon atoms,
a2) a silane of the formula:

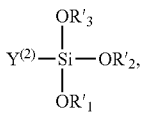

in which
$Y^{(2)}$=$NH_2(CH_2)_2NH(CH_2)_2NH(CH_2)_3$ and
$R'_1$, $R'_2$, $R'_3$=like or unlike alkyl groups having 1 to 6 carbon atoms, and a3) a silane of the formula:

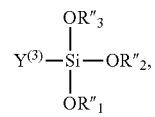

in which $Y^{(3)}$ is selected from fluoro-, methacryloyl-, vinyl- and mercapto-, and $R''_1$, $R''_2$, $R''_3$ are the same or different alkyl groups having 1 to 6 carbon atoms;

b) at least one inorganic filler selected from the group consisting of $SiO_2$, $TiO_2$, ZnO, $Al_2O_3$, $BaSO_4$, $CeO_2$, $ZrO_2$, and mixtures thereof;

c) a solvent having a boiling point at a temperature <85° C.;

d) water;

e) a catalyst selected from the group consisting of an organic acid and an inorganic acid; and f) at least one film-forming binder selected from the group consisting of a melamine resin, an acrylate, and a mixture thereof, in an amount from 0.001% to 15% by weight, and/or g) an epoxy resin in an amount from 0.001% to 15% by weight, wherein the specified amount in f) and g) is based on the total weight of the composition, and with the proviso that the sum of the weight fractions of the components a) to g) equals 100%.

10. The composition of claim 9 prepared without precondensation.

11. A composition, comprising:
a) at least one reaction product of
a1) a silane of the formula:

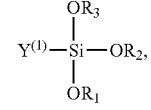

in which
$Y^{(1)}$=3-glycidyloxypropyl-, and
$R_1$, $R_2$, $R_3$=like or unlike alkyl groups having 1 to 6 carbon atoms,
a2) a silane of the formula:

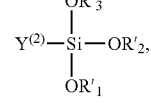

in which
$Y^{(2)}$=$NH_2(CH_2)_2NH(CH_2)_2NH(CH_2)_3$, and
$R'_1$, $R'_2$, $R'_3$=like or unlike alkyl groups having 1 to 6 carbon atoms, and
a3) a silane of the formula:

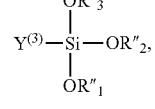

in which Y$^{(3)}$ is selected from fluoro-, methacryloyl-, vinyl- and mercapto-, and R"$_1$, R"$_2$, R"$_3$ are the same or different alkyl groups having 1 to 6 carbon atoms;

b) at least one inorganic filler;

c) a solvent having a boiling point at a temperature <85° C.;

d) water; and e) a catalyst selected from the group consisting of an organic acid and an inorganic acid.

12. The composition according to claim 11, wherein the inorganic filler is selected from the group consisting of SiO$_2$, TiO$_2$, ZnO, Al$_2$O$_3$, BaSO$_4$, CeO$_2$, ZrO$_2$, and mixtures thereof.

13. A method of producing a surface coating on a polymeric surface, the method comprising:

applying the composition of claim 1 to a polymeric surface by dipping, spreading, knifecoating, brushing, rolling, roller-coating or spraying; and curing the composition on the polymeric surface, to form a surface coating on the polymeric surface.

14. The method according to claim 13, wherein the composition is admixed with the silane a1) in an amount from 5% to 40% by weight, the silane a2) in an amount from 5% to 50% by weight, the at least one inorganic filler b) in an amount from 2% to 20% by weight, the solvent c) in an amount from 20% to 60% by weight, the water d) in an amount from 0.5% to 5% by weight, and the catalyst e) in an amount from 0.02% to 0.5% by weight, the specified amount being based in each case on the composition, and with the proviso that the sum of the weight fractions of a)-e) equals 100%.

15. The method according to claim 13, wherein the composition is admixed with the silane a1) and the silane a2) in a molar ratio from 1:3 to 3:1.

16. The method according to claim 13, wherein the composition is admixed with the silane a3) in an amount from 0.5% to 10% by weight, the specified amount being based on the composition, and with the proviso that the sum of the weight fractions of component a1), a2), a3) and b) to e) equals 100%.

17. The method according to claim 13, wherein the composition is admixed with, as further components, f) at least one film-forming binder selected from the group consisting of melamine resin, acrylate, and a mixture thereof, in an amount from 0.001% to 15% by weight, and/or g) an epoxy resin in an amount from 0.001% to 15% by weight, wherein the specified amount in f) and g) is based on the total weight of the composition, and with the proviso that the sum of the weight fractions of the components a) to g) equals 100%.

18. The method according to claim 13, further comprising heating the composition to a temperature from 60° C. to 150° C., to cure the composition.

19. The method according to claim 13, wherein the composition is cured by heating for a duration from 1 to 300 seconds.

20. The method of claim 13, wherein the surface coating has a scratch resistance from 3 N to 20 N.

21. The method of claim 13, wherein the surface coating has an abrasion resistance from 0.1% to 0.5% by weight.

22. The method of claim 13, wherein the surface coating has a film thickness from 1 to 10 μm.

23. The method of claim 13, wherein the surface coating has an extensibility from 0.5% to 10%.

24. The method of claim 13, wherein the surface coating is formed as a single layer by a single application of the composition to the polymeric surface.

25. The method according to claim 13, further comprising:

admixing the composition with, as a further component, h) an inorganic UV absorber selected from the group consisting of zinc oxide, cerium oxide, titanium dioxide, and a mixture thereof, and/or an organic UV absorber selected from the group consisting of hydroxy-phenylbenzotriazole, hydroxybenzophenone, HALS stabilizers, and a mixture thereof; and treating the composition applied to the polymeric surface with UV rays.

26. The method according to claim 25, wherein the component h) is present in an amount from 0.5% to 5% by weight, the specified amount being based on the composition, and with the proviso that the sum of the weight fractions of components a) to h) equals 100%.

* * * * *